Patented Oct. 13, 1931

1,826,897

UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

METHOD OF TREATING FOAM COMPOUNDS

No Drawing. Application filed October 26, 1926. Serial No. 144,397.

In prior applications I have disclosed the preparation and use of certain foam compositions to be mixed with cement for the purpose of producing voids therein upon hardening of the cement, to wit: "Cellular cement and process for making same", Serial No. 608,349, filed December 21, 1922. "Process for making cellular cement", Serial No. 634,370, filed April 24, 1923. "Cellular cement and process for making same", Serial No. 716,804, filed May 29, 1924. "Process for making porous product", Serial No. 716,825, filed May 29, 1924. "Process for making a foamy body", Serial No. 728,279, filed July 26, 1924.

The present invention relates to the introduction into the foam compositions of substances for improving the same in their behavior during the mixing of the cement and foam and comprises the admixture with foam compositions of reagents adapted to retain water, to render the final product harder and more resistant, to hasten and accelerate the setting of the concrete and thicken the foamy substances, to act as preservatives of the foam composition, and generally to improve the foam compositions for various purposes as hereinafter set forth more in detail.

A further object of the invention resides in the use of a reagent as a solvent in the foam composition for cellular concrete which enables the casein present in the composition to be brought into solution without adding foreign substances which may effect the chemical substance of the cement.

A still further object of the invention consists in the admixture with the foam composition of an agent adapted to convert the casein of the composition into paracasein whereby, in the manufacture of cellular concrete, any tendency of the cells to break will be avoided, all as more fully set forth hereinafter.

Other objects and advantages of my improved foam compositions will appear as the description of the invention proceeds.

According to my invention the various reagents specifically mentioned hereinafter may be used individually or collectively in the foam composition to improve the same in various respects.

Silicic acid gel

I have used silicic acid gel in the foam composition because of its beneficial effect in retaining water in its substance whereby a foam containing this material after having been mixed with the cement contains more water than would be normally present therein. The silicic acid gel holds this water during the subsequent setting of the cement so that there is always present sufficient water to completely hydrate the same during curing. There is consequently obtained a completely cured product.

In using silicic acid gel in the manner described the same is first passed through a colloidal mill as a preliminary operation for the purpose of subdividing the reagent into very minute particles. Following this treatment the silicic acid gel is stirred into the casein glue solution employed in the foam composition until the same is homogeneously mixed therewith, the result being an emulsion of silicic acid gel wherein the casein acts as a stabilizer. The whole composition, solution, or emulsion is thereafter run through a colloidal mill to obtain a more effective emulsion but in no way changing the solution. The resultant product is a highly beneficial foam composition capable of retaining absorbed water due to the presence of the silicic acid gel.

Calcium hydrate

Calcium hydrate is employed in my improved foam composition as an alkaline material for the purpose of dissolving casein into the prepared composition. The calcium hydrate may be incorporated in the foam composition in the following manner:

A definite amount of casein is placed in water and thoroughly soaked in the proportion of say one (1) part casein to about five (5) parts of water. There is then added one-fourth (¼) part, more or less, of calcium hydrate in powdered form, the mixture being stirred whereupon the casein goes into solution. By using calcium hydrate as a solvent in foam compositions for cellular concrete the casein is brought into solution without addition of foreign substances to the composition which may chemically effect the substance of the cement. It is well known that calcium hydrate is present in raw Portland cement.

Rennet or rennet casein

The object of using rennet in the preparation of foam compositions is to change casein to the substance called paracasein which is known to be only partially soluble in the presence of lime whereas ordinary casein is completely soluble in the presence of lime.

In the manufacture of cellular concrete by mixing foam with a cement slurry it has occasionally developed that the material will be formed perfectly in the mixing but after pouring into the molds and standing for a period of time the cells tend to break into one another. By the use of paracasein in the foam composition I have found that this breaking of cells is avoided, the cells remaining perfect during the setting of the cement.

In place of rennet as above described I have also found that it is advantageous to employ rennet casein, a form of casein which has been precipitated with rennet during the process of manufacture.

In the preparation of cellular concrete I have found that the foam composition may further be improved by the addition of such substances as boric acid, alcohol, tungstic acid, phosphoric acid, arsenious acid, molybdic acid, or benzoic acid, the effect of these reagents being to cause the final product to become harder and more resistant than they normally would be in their absence. These substances appear to act as catalyzers by hastening or accelerating the crystallization of the cement in curing. Certain of these reagents namely tugstic acid and molybdic acid may be considered as accelerators in that they hasten the setting of the concrete while others, for example phosphoric acid and boric acid, apparently retard the preliminary or first setting, the ultimate result being increased hardness of the material.

The use of benzoic acid is especially desirable in making the foam composition since the same acts not only as an accelerator but also as a hardener and thickener of the foam causing the foam to possess qualities greatly to be desired in the mixing of the materials.

Aluminum hydrate

I have also found that aluminum hydrate is very beneficial to foam compositions for use in manufacturing cellular concrete. Its presence gives the resulting foam two valuable qualities namely:—(1) a toughening of the bubbles whereby the foam will retain its structure after being added to a cement slurry, the aluminum hydrate being a gelatinous substance which is not affected by the ingredients of the cement and (2) the retention of water by the aluminum hydrate after being mixed with the cement slurry serves to enable the cement to properly hydrate without further addition of water in the mix.

To prepare aluminum hydrate for use in foam compositions, I first mix commercial aluminum chloride and water in the following proportions:

| | Parts by weight |
|---|---|
| Aluminum chloride | 45 |
| Water | 418 |
| Ammonia | 30 |

The ammonia should only be sufficient to render the solution slightly alkaline, precipitating the aluminum as a hydrate. In place of ammonia, calcium hydrate may be used for precipitating the aluminum.

The mixture is now run through a colloiding mill and is then ready to mix into the foam composition. Below is a formula for foam composition using the prepared aluminum hydrate described above.

| | Parts by weight |
|---|---|
| Casein | 100 |
| Water | 500 |

Soak the casein till thoroughly saturated with water, then add calcium hydrate (dry) 25 parts by weight. Stir till the caesin is dissolved, then add aluminum hydrate solution 200 parts by weight and stir till thoroughly homogeneous.

The mixture should now be set aside for curing. It will probably at first turn to a thick gel, but after 10 to 15 days it will peptize to a liquid. When liquid, add solution of 15% common glue 45 parts and stir till homogeneous.

This foam composition may thereafter be diluted—1 part in 40 parts of water and used as a foaming solution in the manufacture of cellular concrete.

Although the reagents above mentioned need not all be present in a single foam composition or in any definite proportions I have found that a composition of the following composition yields highly satisfactory results:

| | Parts |
|---|---|
| Casein | 100 |
| Calcium hydrate | 25 |
| Water | 500 |
| Boric acid | 4 |
| Phosphoric acid | 1 |
| Benzoic acid | 4 |
| Betanapthol | 1 |
| Tungstic acid | 1–3 |
| Arsenious acid | 1–4 |

As stated above all these reagents need not necessarily be present in the same formula but each of the reagents may be used separately for its particular purpose and function.

I have also found that the presence in the foam compositions of radio active substances is beneficial as having the effect of hardening and accelerating the setting of the cement. As examples of such radio active substances may be mentioned carnotite ore, radio active uranium oxide, and radio active uranium salts.

As a preservative of the foam compositions I may use arsenious acid combined with benzoic acid, these substances acting as hardeners as well as preservatives.

The specific details given above are not to be construed as limiting upon the invention, the scope of which is governed only by the appended claims.

What is claimed as new is:

1. A composition adapted to produce a foam for use in making cellular concrete, comprising casein, calcium hydrate, water, boric acid, phosphoric acid, benzoic acid, betanapthol, tungstic acid, arsenious acid, and a radio active substance.

2. A composition adapted to produce a foam for use in making cellular concrete comprising a foaming material, casein, and phosphoric acid.

3. A composition adapted to produce a foam for use in making cellular concrete comprising a foaming material, casein, and benzoic acid.

4. A composition adapted to produce a foam for use in making cellular concrete comprising a foaming material, casein, and tungstic acid.

5. A composition adapted to produce a foam far use in making cellular concrete comprising a foaming material, casein, and a radio active substance.

6. A composition adapted to produce a foam for use in making cellular concrete comprising a foaming material, casein, and a preservative comprising arsenious acid and benzoic acid.

7. A composition adapted to produce a foam for use in making cellular concrete comprising a foaming material, casein, and aluminum hydrate.

In testimony whereof I affix my signature.

JOHN A. RICE.